Sept. 20, 1932.     J. TRATHEN     1,878,303
FLUID CONDUCTOR COUPLING
Filed March 29, 1929
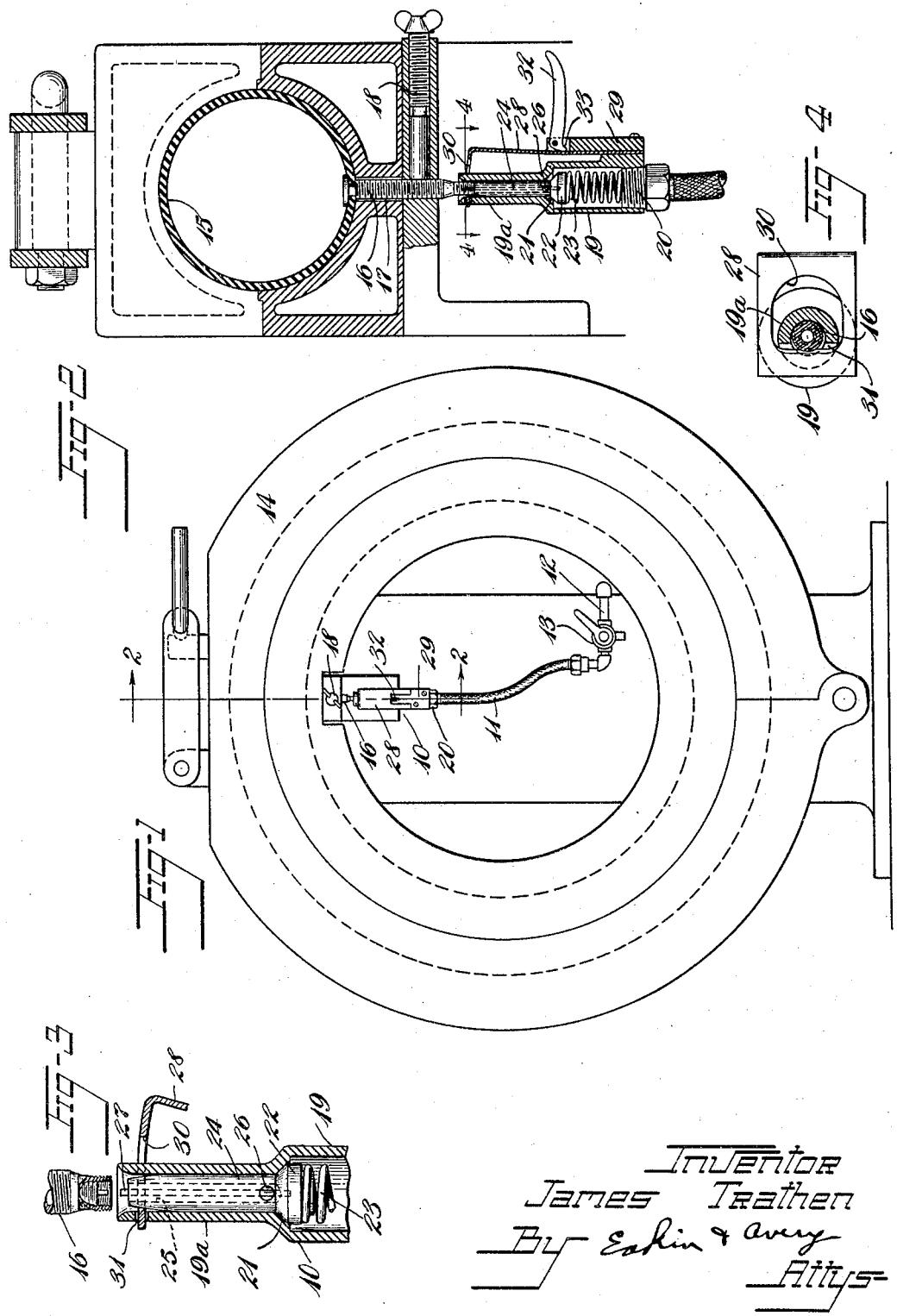
Inventor
James Trathen
By Eakin & Avery
Attys Patented Sept. 20, 1932

1,878,303

UNITED STATES PATENT OFFICE

JAMES TRATHEN, OF AKRON, OHIO, ASSIGNOR TO THE B. F. GOODRICH COMPANY, OF NEW YORK, N. Y., A CORPORATION OF NEW YORK

FLUID CONDUCTOR COUPLING

Application filed March 29, 1929. Serial No. 350,987.

This invention relates to quick-detachable couplings for fluid-conducting tubes, and is especially useful for connecting a flexible air hose with the valve stem of an inner tube for pneumatic tires, either during the manufacture of the tube or after it is in service.

The chief object of the invention is to provide an improved coupling of the character mentioned which may be easily and quickly attached and detached from a companion fluid conductor. Other objects are to provide such a coupling with automatic valve mechanism and to provide a secure mounting of the device in coupled relation.

Of the accompanying drawing:

Fig. 1 is a front elevation of a watch-case vulcanizer, and my improved coupling attached to the valve stem of an inner tube therein.

Fig. 2 is a section on line 2—2 of Fig. 1 on a larger scale.

Fig. 3 is a view, on a larger scale, of portions of the device shown in Fig. 2, the coupling and the valve stem being shown in disassociated relation.

Fig. 4 is a section on line 4—4 of Fig. 2.

Referring to the drawing, for purposes of illustration I show my improved coupling, generally designated 10, mounted upon the end of a flexible air hose 11 which connects with a fluid-pressure line 12 in which is a three-way valve 13. The fluid-pressure line 12 is associated with a watch-case vulcanizer, conventionally shown at 14, in which is mounted a rubber inner tube 15 to be vulcanized, and the inner tube is provided with the usual valve stem 16 which extends through a suitable radial aperture 17 in the inner periphery of the vulcanizer, and is secured in said aperture by a thumb-screw 18 threaded through the wall of the vulcanizer. Preferably the valve stem 16 includes the usual valve mechanism for retaining fluid in the tube. The coupling 10 is adapted to be secured to the valve stem 16, and automatically upon its application thereto to open the valve therein and deliver pressure fluid from the conductor 11 into the inner tube 15.

The coupling 10 comprises a tubular sleeve-like structure 19 which is of reduced diameter, as shown at 19ª, for about half its length, the large end of the structure being threaded onto a nipple 20 on the end of the flexible conductor 11. That portion of the structure 19 which connects the reduced portion 19ª with the body portion thereof is internally formed with a tapered valve seat 21, and a complementally tapered valve member 22 is mounted upon said seat and normally urged thereagainst by a compression spring 23 mounted in the structure 19 between the valve 22 and the nipple 20. The valve 22 is formed with an axial stem 24 positioned within the reduced portion 19ª of the coupling and engaging the wall thereof with a sliding fit, said stem extending substantially to the open end of the portion 19ª, and preferably having its own end portion slightly tapered. The stem 24 is formed with an axial bore 25 which communicates near the valve 22 with the cylindrical outer face of the stem through one or more radial bores or ports 26 formed in the stem. A pin 27 for opening the valve of the inner tube is mounted in the valve 22 and extends through the bore 25 in the stem 24 and projects from the end thereof.

The open end of portion 19ª of the coupling preferably is formed with a flared or countersunk orifice as shown to facilitate the mounting of the coupling upon the valve stem 16 of the inner tube 15, wherein the coupling portion 19ª is telescoped with the end portion of the valve stem 16 as is clearly shown in Fig. 2. When so assembled the pin 27 bears against the valve mechanism in the stem 16 to open the same, and the end of the valve stem 16 bears against the end of the stem 24 of the valve 22 to hold the latter away from its seat 21 against the pressure of the spring 23 and the air pressure in the hose 11. With the valve 22 in unseated position, the ports 26 in the stem 24 are within the interior of the large end portion of the coupling 19 and pressure fluid flowing into the latter from the conductor 11 passes out through the ports 26 and bore 25 into the opened valve stem 16.

For securing the coupling 10 to the valve stem 16 after they are telescoped as described, a flexible leaf-spring 28 is mounted upon the side of the coupling 10 beneath a supporting plate 29 thereon, the free end portion of the spring being bent substantially at a right angle toward the coupling, and formed in said angular portion with an elongate aperture 30 through which the end portion of the coupling extends. The spring 28 is so formed that its longitudinal portion stands away from the coupling, and the end portion of the latter, within the aperture 30 of the spring, is formed with a chordal slot 31 extending through its wall, into which slot the edge of the spring, at one end of its aperture 30, is drawn, by the resilience of the spring, to bear against the stem 24 of the valve 22.

The arrangement is such that when the coupling 10 is telescoped upon the end portion of the valve stem 16 and the end of the stem 24 thereby depressed beyond the slot 31, the edge of the spring 28 extending through the slot engages the threads formed on the valve stem and holds the coupling and valve stem securely together. Preferably, the edge of the spring 28 which extends through the slot 31 is beveled on its upper side as shown to permit the threaded portion of the valve stem 16 automatically to move the spring out of the slot in the mounting of the coupling on the valve stem.

For moving the spring edge out of the slot 31 for uncoupling the members and for retaining it in that position, I provide a cam-lever 32 pivotally mounted in a slot formed in the supporting plate 29, the hub portion of said lever being formed with a cam or eccentric 33 adapted to permit the spring 28 to move into latching position when the lever is raised, as shown in Fig. 2, and to engage the spring and force it toward the coupling so that it moves out of the slot therein when the lever is depressed, the lever being adapted to latch the spring in its flexed condition by an over-center effect of its cam 33.

The invention provides for quickly and easily mounting the coupling on a threaded member and removing it therefrom, and for automatically delivering fluid to the threaded member as soon as the coupling is applied thereto.

The invention is susceptible of modification within the scope of the appended claims.

I claim:

1. In a coupling, the combination of a tubular structure formed with a slot, a leaf spring mounted upon the side of said structure and having an angularly disposed end portion directed toward said member, a margin on said end portion extending into said slot and being adapted to engage a coupling member mating with said tubular member, and a cam lever for flexing the leaf spring.

2. In a coupling, the combination of a pair of tubular members adapted to mate in telescoped relation, one of which members is provided with a slot in its wall, valves in the respective members adapted to be opened by movement of the members into mated relation, and latching means on said slotted member adapted to engage the other member through the slot of the first member and alone to hold the two in telescoped relation.

In witness whereof I have hereunto set my hand this 22nd day of March, 1929.

JAMES TRATHEN.